J. D. PURSEL.
RESILIENT WHEEL.
APPLICATION FILED MAR. 24, 1917.

1,254,536.

Patented Jan. 22, 1918.
2 SHEETS—SHEET 1.

WITNESSES

INVENTOR
J. D. Pursel,
BY Victor J. Evans
ATTORNEY

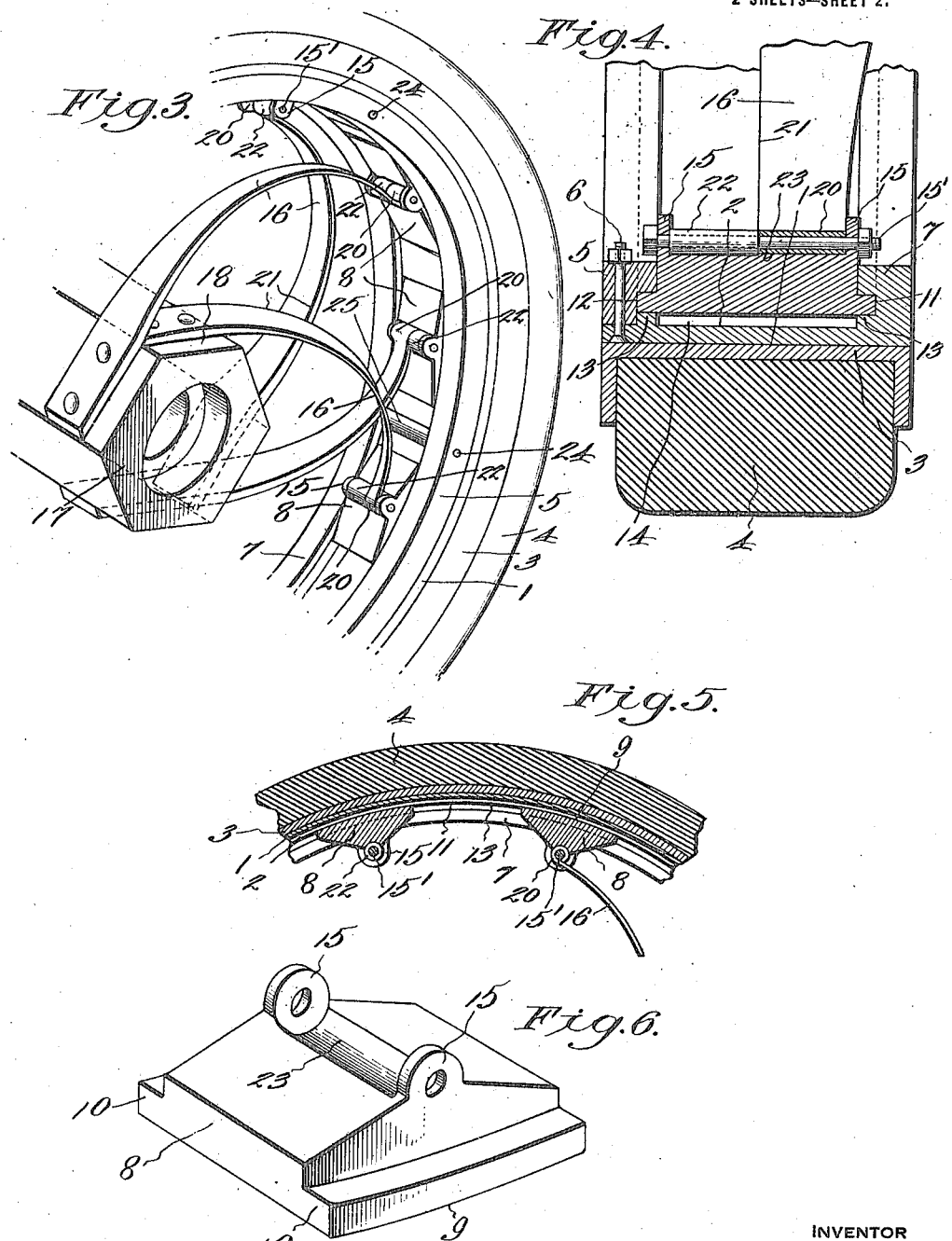

UNITED STATES PATENT OFFICE.

JOHN D. PURSEL, OF NEW YORK, N. Y.

RESILIENT WHEEL.

1,254,536.  Specification of Letters Patent.  Patented Jan. 22, 1918.

Application filed March 24, 1917. Serial No. 157,274.

*To all whom it may concern:*

Be it known that I, JOHN D. PURSEL, a citizen of United States of America, residing at New York city, in the county of New York and State of New York, have invented new and useful Improvements in Resilient Wheels, of which the following is a specification.

This invention relates to resilient wheels, the broad object in view being to dispense with pneumatic tires and the troubles and annoyances incident to the use thereof, and a substitute therefor, novel means for absorbing all ordinary road shocks and vibrations, preventing the transmission of the same to the axle chassis and body of the vehicle in conjunction with which the resilient wheel is used.

More specifically stated, the object of the invention is to produce a resilient wheel embodying in combination with a hub and a rim, novel shock absorbing and cushioning means interposed between the hub and rim, said means comprising resilient spokes having a novel relation to the hub and rim and to each other, whereby the spokes have a mutually bracing relation to each other, also serving as bracing means between the rim and hub, and admitting of a universal flexibility in all directions between the hub and rim.

With the above and other objects in view, the invention consists in the novel construction, combination and arrangement of parts, herein described, illustrated and claimed.

In the accompanying drawings:—

Fig. 3 is a fragmentary perspective view of the wheel.

Fig. 4 is an enlarged transverse section through the rim, showing the parts intimately associated therewith.

Fig. 5 is a fragmentary section taken longitudinally of the rim, showing the parts intimately associated therewith.

Fig. 6 is a detail perspective view of one of the shoes.

Figure 1:
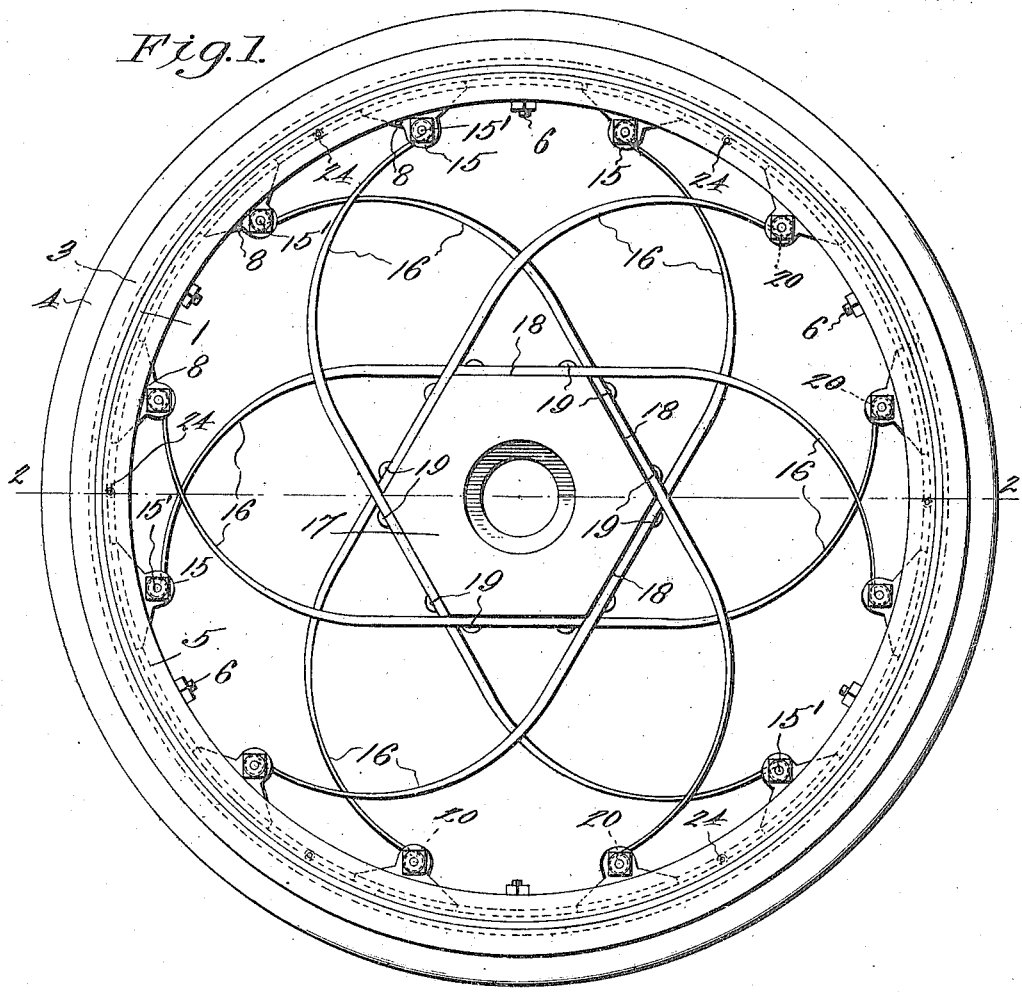
Figure 1 is a side elevation of a resilient wheel embodying the present invention.
Figure 2:
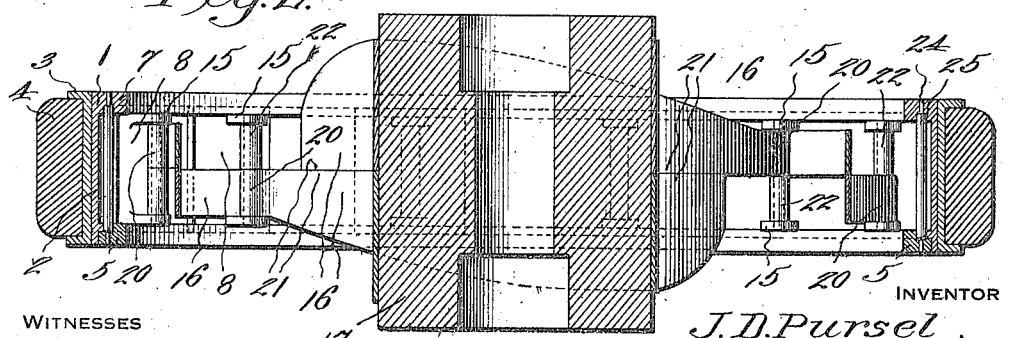
Fig. 2 is a diametrical section through the same on the line 2—2 of Fig. 1.

The resilient wheel contemplated in this invention comprises, in the preferred embodiment thereof, a rim 1 which is formed in its inner face with a channel 2, the rim 1 being adapted to support a tire carrying rim 3, 4 designating the tire carried thereby.

The rim 1 comprises a removable side section 5 which is detachably secured to the body of the rim by fastening means 6, the body of the rim and the removable section 5 thereof being annular or endless. The rim may be thus said to comprise a body having an integral flange 7 at one side, and a removable flange 5 at the other side, this being done in order to provide for the association and disassociation with the rim of a plurality of shoes 8 having a slidable relation to and connection with the rim 1 as shown in Fig. 4.

Each of the shoes 8 has an arcuate outer face 9 corresponding to the curvature of the rim 1 and also has projecting from the opposite sides thereof arcuate ribs 10 which are received in shoe retaining guide-ways 11 and 12 formed respectively in the inner faces of the integral flange 7 and the removable flange or section 5. The rim is also provided with annular bearing shoulders or tracks 13 in laterally spaced relation to each other and against which the outer faces 9 of the shoes rest. A clearance or non-bearing space 14 is thus left between the major portion of the outer face of each shoe 8 and the main body of the rim 1, providing for an easy sliding action of the shoes in relation to the rim. Each shoe 8 is further provided on the inner face thereof with lugs 15 to receive a coupling pin or bolt 15' by means of which the outer ends of series of resilient spokes 16 are attached to said shoes.

The hub 17 has a polygonal periphery composed of a plurality of flat faces 18 directly against which the inner and wider ends of the spokes 16 are firmly secured by fastening means 19. This provides a firm and efficient connection or anchorage between the inner ends of the spokes and the hub, preventing any possibility of relative movement between said inner ends of the spokes and the hub. Each of the spokes 16 gradually decreases in width from the inner end portion thereof toward the outer extremity thereof and said spring is of arcuate or curvilinear formation and is further provided at its outer extremity with an eye or knuckle 20 which, it will be noted, is formed by recurving or rolling the outer end portion of the spring reversely to the general curvature of the spoke so that said eye or knuckle 20 is located upon and projects over the convex side of the respective spoke. It will also be observed that there are two series of spokes and that the inner edges or faces 21 of the spokes lie in parallelism and preferably in sliding contact with each other, the spokes crossing each other at points between the hub and rim and serving to mutually brace each other laterally of the wheel. This adds greatly to the lateral stability of the wheel and the ability thereof to yieldingly withstand and cushion lateral thrusts imparted to the wheel. This produces a wheel of unusual easy and comfortably riding qualities and one which practically absorbs all of the disagreeable vibrations usually imparted to the chassis and body of a vehicle. It will also be noted that the combined widths of the inner ends of the two series of springs is greater than the width of the rim. This materially increases the lateral bracing effect of the spokes.

The lugs 15 of the shoes 8 are arranged a distance apart equal to or slightly greater than the combined widths of the outer ends of the two series of spokes as shown in Fig. 4 and a spacing sleeve or tubular washer 22 is placed around each coupling pin or bolt 15' between the knuckle 20 of the adjacent spoke 16 and one of the lugs 15 thus providing for the proper positioning of the outer extremity of each spoke. Each shoe is also formed with a concaved seat 23 described on an arc of which the coupling pin or bolt 15' is the center. This provides for a greater bearing surface between the outer end of each spoke and the respective shoe 8.

The rim has means for limiting the sliding movement of one or more of the shoes 8, said limiting means being shown in the form of one or more pins or bolts 24 extending through the flanges 5 and 7 of the rim. Cushions or bumpers 25 of rubber or other suitable cushioning material may be placed around one or more of the stops or limiting pins or bolts 24 against which the adjacent shoe or shoes will strike. One or more driving connections are thus provided between the shoes 8 and the rim 1, enabling the wheel to be used either as a driving or traction wheel for a motor vehicle or as an idly rotating wheel such as one of the front or steering wheels of a motor vehicle.

It will of course be understood that the wheel and the several parts thereof hereinabove described and shown may be made of any desired dimensions and the resilient spokes may be constructed of any suitable material of any desired gage. These and other advantages in the form, proportion and minor details of construction may be resorted to without departing from the principle or sacrificing any of the advantages of the invention.

I claim:—

1. In a resilient wheel, the combination of a hub, a rim, series of resilient spokes having their inner ends fastened to the hub, shoes slidable circumferentially of the rim and having the outer extremities of the spokes attached thereto, each of said shoes being of a width equal to the combined width of the outer ends of adjacently disposed series of spokes and having lugs in laterally spaced relation to each other, and each spoke having a knuckle at its outer extremity, a coupling pin inserted through said lugs and knuckle, and a spacing sleeve inclosing a portion of said pin between said knuckle and one of said lugs, each shoe being formed with a concaved seat for the respective knuckle described on an arc concentric with the coupling pin.

2. In a resilient wheel, the combination of a hub, a rim, resilient curvilinear spokes fastened to the hub and decreasing in width toward their outer extremities, shoes to which the outer extremities of the spokes are attached slidable circumferentially of the rim, said spokes being arranged in a plurality of circular series, the spokes of one series being curved oppositely to the spokes of the adjacent series and crossing the latter between the hub and rim, the inner adjacent edges of the spokes being disposed in parallelism, and annular bearing shoulders for the outer faces of said shoes arranged in laterally spaced relation to each other.

3. In a resilient wheel, the combination of a hub, a rim, resilient curvilinear spokes fastened to the hub and decreasing in width toward their outer extremities, shoes to which the outer extremities of the spokes are attached slidable circumferentially of the rim, said spokes being arranged in a plurality of circular series, the spokes of one series being curved oppositely to the spokes of the adjacent series and crossing the latter between the hub and rim, the inner adjacent edges of the spokes being disposed in parallelism, and means on said rim for limiting and cushioning the sliding movements of said shoes.

In testimony whereof I affix my signature.

JOHN D. PURSEL.

Copies of this patent may be obtained for five cents each, by addressing the "Commissioner of Patents, Washington, D. C."